No. 672,131. Patented Apr. 16, 1901.
L. E. & H. S. MERRILL.
L. E. MERRILL, Administratrix of H. S. MERRILL, Dec'd.
AUTOMATIC TYPE JUSTIFYING SPACE.
(Application filed May 18, 1900.)
(No Model.)
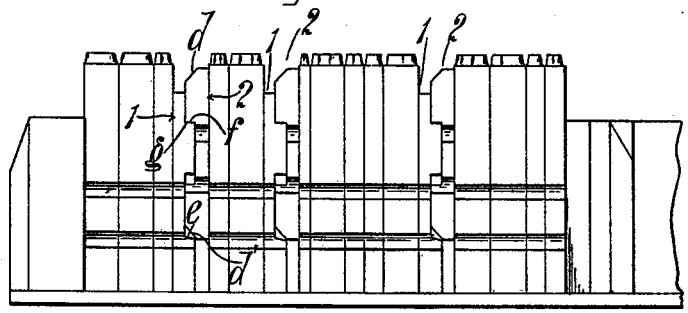
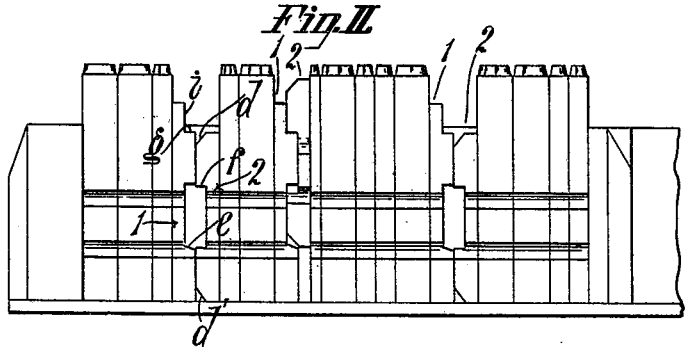
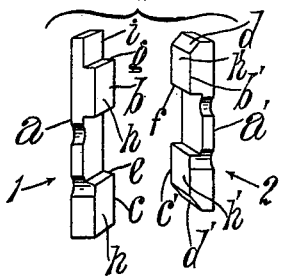

UNITED STATES PATENT OFFICE.

LENA E. MERRILL, OF RIVERSIDE, CALIFORNIA, FOR HERSELF AND AS ADMINISTRATRIX OF HARRY S. MERRILL, DECEASED.

AUTOMATIC TYPE-JUSTIFYING SPACE.

SPECIFICATION forming part of Letters Patent No. 672,131, dated April 16, 1901.

Application filed May 18, 1900. Serial No. 17,159. (No model.)

*To all whom it may concern:*

Be it known that I, LENA E. MERRILL, a citizen of the United States, residing at Riverside, in the county of Riverside and State of California, and HARRY SUMNER MERRILL, deceased, late a citizen of the United States, residing at said Riverside, have invented a new and useful Automatic Type-Justifying Space, of which the following is a specification.

The object of this invention is to provide means for simultaneously and automatically justifying the lines of type in a stick.

This invention is applicable for use for hand type-setting and for type-setting machines.

The accompanying drawings illustrate this invention.

Figure I shows the newly-invented automatic justifying-space in use in a line of type before the line has been justified. Fig. II is a view of the same after the line has been justified. Fig. III is a perspective view of the newly-invented automatic justifying-space with the parts separated.

This newly-invented automatic type-justifying space comprises two members 1 2, forming the two halves of the space. One of the members is composed of a body $a$, provided with two lugs or projections $b\ c$, spaced apart. The other member 2 is composed of a body $a'$, provided with two lugs or projections $b'\ c'$, corresponding in position to the projections $a\ b$ and spaced apart to interlock with said projections or lugs $a\ b$ when the justifying member 2 is in one position and to allow the faces of the projections of the two members to engage when the justifying member is in another position, thus to contract and expand the justifying-space formed by the two members. The space between the projections of the members, respectively, is of greater length than the projections, respectively.

The body $a$ of the main member 1 is of a definite length, greater than the body $a'$ of the justifying member 2. The projections $b'\ c'$ of the shorter justifying member 2 are beveled at their outer ends, as at $d\ d'$, and preferably the upper shoulder $e$ of the lug or projection $c$ of the member 1 slopes downward from the body $a$. The lower shoulder $f$ of the upper projection $b'$ of the shorter justifying member 2 is abrupt, being substantially at right angles to the body $a'$, and the upper shoulder $g$ of the upper lug or projection $b$ of the main longer member 1 is also abrupt, being substantially at right angles to the body $a$ to form a rest upon which the shoulder $f$ will catch.

$h\ h'$ indicate the contacting faces of the several projections or lugs $b\ c\ b'\ c'$. These faces are properly spaced, so that when the justifying member 2 is brought into the expanded position the faces $h'$ of the member 2 will rest against the faces $h$ of the member 1.

$i$ indicates an upward extension of the body $a$, against which the uppermost face $h'$ of the member 2 will rest when the two members are interlocked.

The main member 1 of the space or expander is made of the same length as an ordinary space, and the projections or lugs $b'\ c'$ of the member 2 are each slightly longer than the upward extension $i$ of member 1, so that when the two members are interlocked and set in the line with the type the upper end of the justifying member 2 will be slightly below the face of the type.

In practical use the two members 1 2 of the space will be set in the line of type with their projections interlocked. This forms the contracted justifying space or expander which may be expanded if so required for justifying the line. The two members of each space are so formed that when normally interlocked the justifying half 2 of the space hangs at the top of the lug or projection $b$ on its companion 1. After the type is set the lines are justified by beating the face of the type in the stick or in the form with a stereotype-brush or a brush similar thereto. This throws the upper end of the justifying member 2 away from the upper end of the body of its companion 1, thus releasing the shoulder $f$ from the catch $g$. The lower beveled end $d$ then slides down over the beveled face $e$ of the lug $c$, so that the faces $h$ of the main member 1 and $h'$ of the justifying member 2 will rest against each other. The bevel face $d$ of the upper projection $b'$ directs the force applied by the blow of the stereotype-brush to throw the upper end of the justifying member 2 away from the main member 1, thus to allow the justifying member to fall into the expanding position. This action of the several justifying members 2 contained in the line or of a sufficient number of such members will expand the line to the full measure. In this manner the justifying of a stick full of type will readily be accomplished in a few moments time.

The justifying-spaces are practical in sizes down to eight point.

In setting the type-matter each line should include one five-em expander or space as well as a four-em expander or space, so that proper variety of spacing may be present.

What I claim, and desire to secure by Letters Patent of the United States, is—

1. An automatic type-justifying space comprising two members, one of which is furnished on one side with projections, the upper end of one of which projections forms an abrupt shoulder, and the other member is furnished on one side with corresponding projections, said projections being spaced apart to allow the members to interlock in one position and the outermost end of one of the projections on such member being beveled and the innermost end of the other projection being formed in an abrupt shoulder to catch upon the shoulder of the other member.

2. An automatic type-justifying space comprising two members, one of which is furnished on one side with projections and the other is furnished on one side with corresponding projections, the space between the projections of the members respectively being of greater length than the projections respectively, one of the projections on one of the members being formed in an abrupt shoulder at its outermost end and the other of the members being formed in an abrupt shoulder at the innermost end of one of its projections to catch upon the said shoulder of the one member, and beveled at the outermost end of its other projection to slide over the shoulder of the lowermost projection of the one member.

3. An automatic type-justifier comprising two members, one of which is furnished with a body of a definite length and furnished with projections spaced apart and the outer end of one of which projections is formed in an abrupt shoulder below the upper end of the body, the body of the other of said members being of less length and furnished with like projections to fit against the body of the first-named member and beveled at the lower end of the lower of said projections to slide over the shoulder formed by the lower projection of the first-named member, and formed in an abrupt shoulder at the inner end of its other projection, to catch on the shoulder of the other member.

4. An automatic type-justifying space comprising two members, one of which is furnished on one side with projections and the other is furnished on one side with corresponding projections, said projections being spaced apart to allow the members to interlock in one position and the outermost ends of the projections of one of the members at the innermost faces being beveled.

5. An automatic type-justifying space comprising a main member furnished with projections on one side of the body, and spaced apart, and an upward extension above the upper one of said projections; and a justifying member with projections to interlock with the projections of the main member, and fit against the body of the main member in one position, and to fit against the projections of the main member in another position.

In testimony whereof I have signed my name to this specification, in the presence of two subscribing witnesses, at Los Angeles, California, this 25th day of April, 1900.

LENA E. MERRILL.
    LENA E. MERRILL,
*Administratrix of the estate of Harry S. Merrill, deceased.*

Witnesses:
 JAMES R. TOWNSEND,
 JULIA TOWNSEND.